(12) United States Patent
Yamada et al.

(10) Patent No.: US 10,335,951 B2
(45) Date of Patent: Jul. 2, 2019

(54) INFORMATION PROCESSING APPARATUS, INFORMATION PROCESSING METHOD, ROBOT CONTROL APPARATUS, AND ROBOT SYSTEM

(71) Applicant: CANON KABUSHIKI KAISHA, Tokyo (JP)

(72) Inventors: Daisuke Yamada, Kawasaki (JP); Kazuhiko Kobayashi, Yokohama (JP); Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 15/209,489

(22) Filed: Jul. 13, 2016

(65) Prior Publication Data

US 2017/0028561 A1 Feb. 2, 2017

(30) Foreign Application Priority Data

Jul. 29, 2015 (JP) .................................. 2015-149244
Feb. 3, 2016 (JP) .................................. 2016-019296
May 2, 2016 (JP) .................................. 2016-092681

(51) Int. Cl.
| | |
|---|---|
| *G06F 19/00* | (2018.01) |
| *B25J 9/16* | (2006.01) |
| *B25J 13/08* | (2006.01) |
| *B25J 19/02* | (2006.01) |

(52) U.S. Cl.
CPC ............ *B25J 9/1697* (2013.01); *B25J 9/1612* (2013.01); *B25J 13/082* (2013.01); *B25J 13/085* (2013.01); *B25J 19/023* (2013.01); *G05B 2219/40053* (2013.01)

(58) Field of Classification Search
CPC ...... B25J 9/1697; B25J 9/1612; B25J 13/082; B25J 13/085; B25J 19/023; G05B 2219/40053
USPC ....................................................... 700/259
See application file for complete search history.

(56) References Cited

U.S. PATENT DOCUMENTS

| | | | | | |
|---|---|---|---|---|---|
| 8,855,824 | B2 * | 10/2014 | Ogami | ................... | B25J 9/1682 700/245 |
| 8,862,267 | B2 * | 10/2014 | Aoba | .................... | B25J 9/1612 700/245 |
| 8,977,395 | B2 * | 3/2015 | Negishi | .................. | B25J 9/1607 700/248 |

(Continued)

FOREIGN PATENT DOCUMENTS

JP 3300682 B2 7/2002

*Primary Examiner* — Ronnie M Mancho
(74) *Attorney, Agent, or Firm* — Canon USA Inc., IP Division

(57) ABSTRACT

An information processing apparatus includes, an acquisition unit that acquires surface position information on an object, a decision unit that decides a measurement position for measuring the object based on the surface position information acquired by the acquisition unit, a measurement unit that measures contact position information on contact with the object at the measurement position decided by the decision unit, a creation unit that creates map information indicative of spatial position information on the object based on the contact position information measured by the measurement unit, and a recognition unit that recognizes the position and orientation of the object based on the map information created by the creation unit.

16 Claims, 7 Drawing Sheets

(56) References Cited

U.S. PATENT DOCUMENTS

| | | | | |
|---|---|---|---|---|
| 9,043,023 B2* | 5/2015 | Noro | ............... | B25J 9/1687 |
| | | | | 700/249 |
| 9,044,858 B2* | 6/2015 | Ito | ............... | B25J 9/1612 |
| 9,089,971 B2* | 7/2015 | Aoba | ............... | B25J 9/1697 |
| 9,266,237 B2* | 2/2016 | Nomura | ............... | B25J 9/1612 |
| 9,302,391 B2* | 4/2016 | Iio | ............... | B25J 9/1679 |
| 9,727,053 B2* | 8/2017 | Ito | ............... | B25J 9/1697 |
| 2013/0245828 A1* | 9/2013 | Tateno | ............... | B25J 9/1697 |
| | | | | 700/259 |
| 2014/0046486 A1* | 2/2014 | Mimura | ............... | B25J 9/1697 |
| | | | | 700/259 |
| 2014/0067126 A1* | 3/2014 | Watanabe | ............... | B25J 9/1697 |
| | | | | 700/259 |
| 2014/0229005 A1* | 8/2014 | Suzuki | ............... | B25J 9/1692 |
| | | | | 700/254 |
| 2014/0267823 A1* | 9/2014 | Nagura | ............... | B25J 9/1697 |
| | | | | 348/222.1 |
| 2014/0371910 A1* | 12/2014 | Hayashi | ............... | B25J 9/1697 |
| | | | | 700/259 |
| 2015/0120054 A1* | 4/2015 | Watanabe | ............... | B25J 9/1612 |
| | | | | 700/259 |
| 2015/0125035 A1* | 5/2015 | Miyatani | ............... | G06T 7/0046 |
| | | | | 382/103 |

* cited by examiner

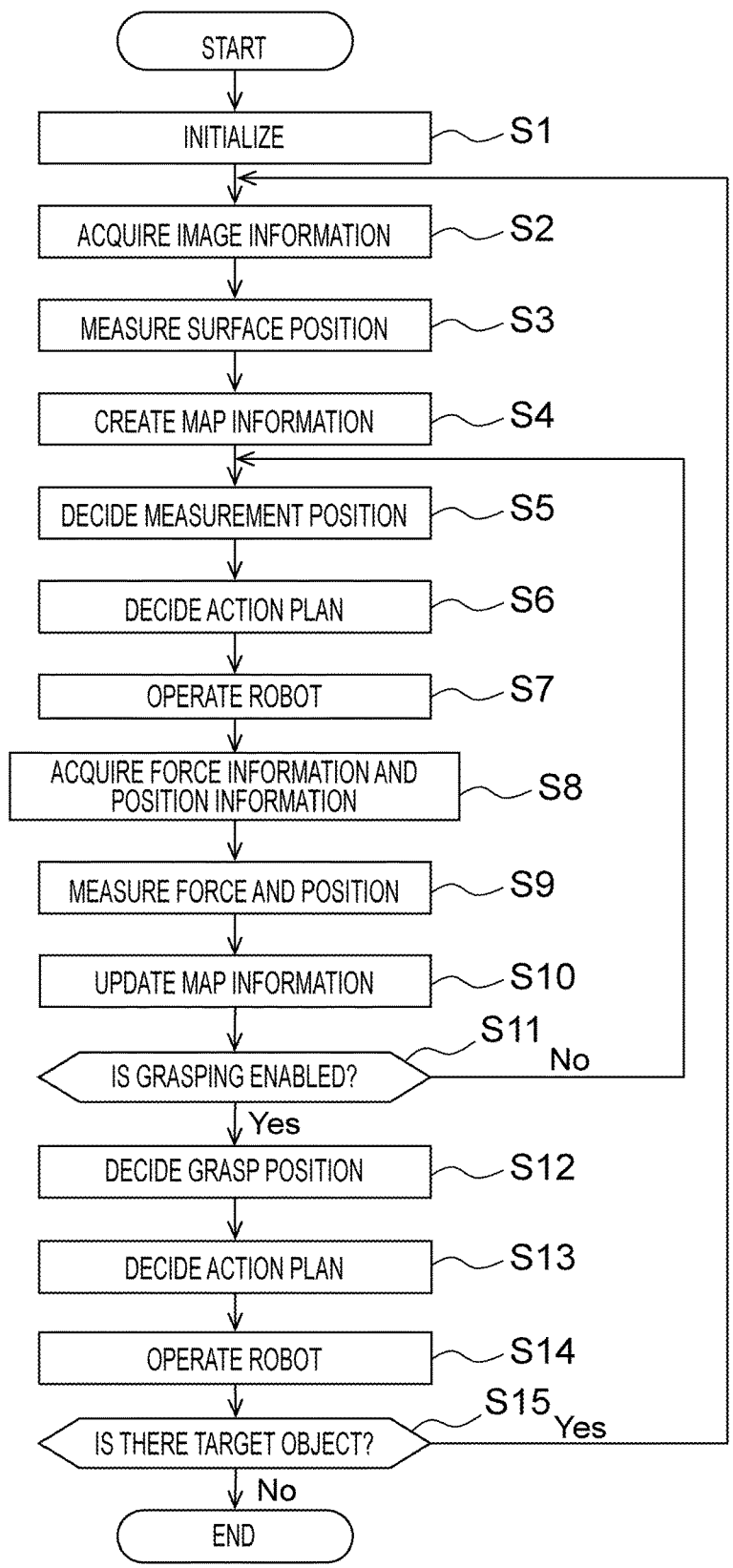

INFORMATION PROCESSING APPARATUS, INFORMATION PROCESSING METHOD, ROBOT CONTROL APPARATUS, AND ROBOT SYSTEM

BACKGROUND OF THE INVENTION

Field of the Invention

The present invention relates to an information processing apparatus, an information processing method, a robot control apparatus, and a robot system.

Description of the Related Art

As a technique for allowing a robot to grasp one each of target objects randomly piled up in a random fashion, there is known a robot apparatus that uses a visual sensor to determine the position and orientation of a target object. Japanese Patent No. 3300682 discloses a method for recognizing the position and orientation of a target object by imaging an object identical in shape to the target object from a plurality of directions to create a teach model and matching the teach model with image data of the piled target objects.

SUMMARY OF THE INVENTION

In Japanese Patent No. 3300682, at the measurement with the visual sensor, only the information on the surface position of the imaged object can be acquired. Moreover, in accordance with the technique described in Japanese Patent No. 3300682, when the target object is wrapped in a plastic bag or a cushioning material, the target object seen in the image data does not match with the teach model. In this case, therefore, the robot cannot recognize properly the position and orientation of the target object in the plastic bag or cushioning material and cannot grasp the target object.

To solve the foregoing problem, a mode of an information processing apparatus according to an aspect of the present invention includes: an acquisition unit that acquires surface position information on an object; a decision unit that decides a measurement position for measuring of the object based on the surface position information acquired by the acquisition unit; a measurement unit that measures contact position information on contact with the object at the measurement position decided by the decision unit; a creation unit that creates map information indicative of spatial position information on the object based on the contact position information measured by the measurement unit; and a recognition unit that recognizes the position and orientation of the object based on the map information created by the creation unit.

According to the specification of the subject application, it is possible to recognize properly the position and orientation of the target object even when the target object cannot be recognized correctly only with the surface position information.

Further features of the present invention will become apparent from the following description of exemplary embodiments (with reference to the attached drawings).

BRIEF DESCRIPTION OF THE DRAWINGS

FIG. 4 is a flowchart of operations in the first embodiment.

DESCRIPTION OF THE EMBODIMENTS

Embodiments for carrying out the present invention will be explained below in detail with reference to the accompanying drawings.

The embodiments described below are mere examples of means for implementing the present invention, and can be modified or changed as appropriate depending on the configuration of an apparatus to which the present invention is applied and various conditions. The present invention is not limited to the following embodiments.

First Embodiment

In a first embodiment, map information on objects (a target object and surrounding objects in the vicinity of the target object) is created by integrating three-dimensional position information on the objects measured based on image information on the objects obtained through imaging by an imaging apparatus and measurement information from a force sensor. Then, the created map information is used to recognize the position and orientation of the target object. In the embodiment, the target object is an object to be operated by a robot and includes components such as a toner cartridge wrapped in a plastic bag or a cushioning material, for example. The measurement with the force sensor means that, when the force sensor detects that the robot is in contact with the object, a position detection sensor measures the position of the contact by the robot. The map information refers to spatial information on the target object and the surrounding objects.

Figure 1:
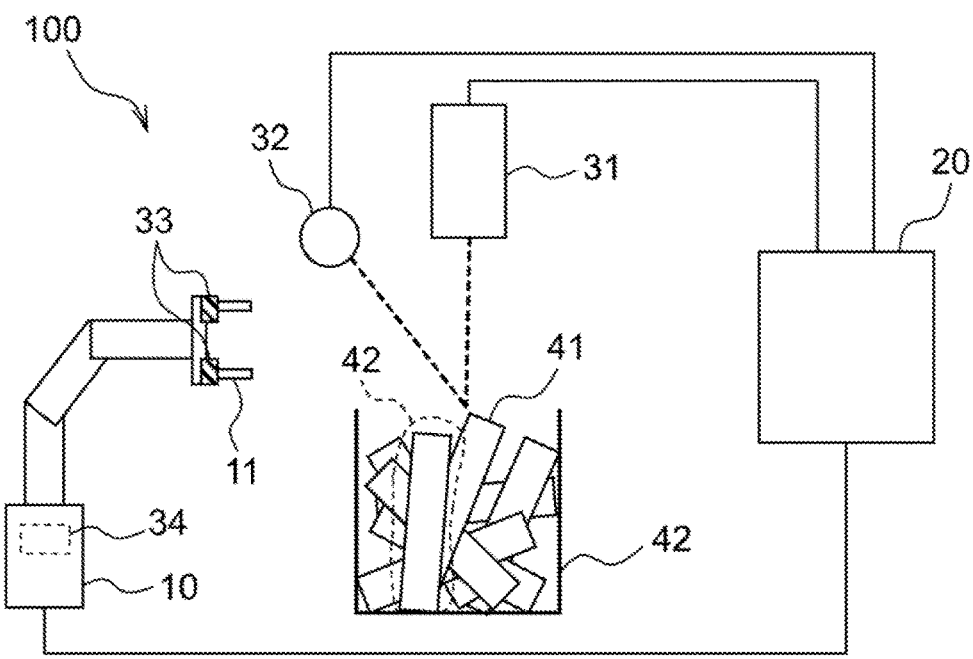
FIG. 1 is a diagram illustrating a configuration example of a robot system of a first embodiment.

FIG. 1 is a diagram illustrating a configuration example of a robot system 100 including an information processing apparatus 20 of the embodiment.

The robot system 100 includes a robot 10 and an information processing apparatus 20. The robot 10 is a multijoint robot, for example, that includes a manipulator such as a robot arm and an end effector 11 such as a robot hand. The robot 10 also includes a position and orientation change mechanism that can change the position and orientation of the end effector 11 by altering the angles of the joints of the manipulator. The position and orientation change mechanism may be driven by a power motor or an actuator that operates under fluid pressure such as oil pressure or air pressure. The position and orientation change mechanism is driven according to operation instruction information output from the information processing apparatus 20.

The end effector 11 is a tool for implementing operations of the robot 10 according to the kind of the target object, and may be a hand having a motor-driven chuck mechanism to grasp the target object or a hand with an absorption pad for absorbing the target object under air pressure. The end effector 11 is detachably attached to the robot arm and can be replaced with another one depending on the kind of work.

The robot 10 is not limited to a multijoint robot but may be a movable machine capable of numerical control (NC).

The robot 10 performs actions decided by the information processing apparatus 20 to transfer or grasp a target object 41. In the embodiment, the actions refer to operations of the robot 10 for recognizing or manipulating the target object 41.

The target object 41 is a component such as a toner cartridge to be grasped and transferred by the robot 10, and may be wrapped in a plastic bag or a cushioning material. That is, in the vicinity of the target object 41, there are surrounding objects 42 such as a plastic bag or a cushioning material wrapping the target object 41. The surrounding objects 42 refer to all objects other than the target object 41 that are positioned in the vicinity of the target object 41, and include a container storing a pile of target objects 41 and objects placed around the container, for example.

The robot system 100 further includes an imaging apparatus 31, a light source 32, a force sensor 33, and a position detection sensor 34.

The imaging apparatus 31 is a visual sensor composed of a camera, a light detection sensor, a photo diode, and others to acquire image information on the target object 41 and the surrounding objects 42. The imaging apparatus 31 outputs the acquired image information to the information processing apparatus 20. The light source 32 is composed of a projector, for example, and emits visible light or infrared light from a laser light source to project uniform illumination light or pattern light onto the target object 41 and the surrounding objects 42. The imaging apparatus 31 captures images of the target object 41 and the surrounding objects 42 onto which the light source 32 projects the light. The imaging apparatus 31 can also capture the images of the target object 41 and the surrounding objects 42 even when the light source 32 projects no light. The imaging apparatus 31 and the light source 32 may be arranged at fixed positions in the upper side of an imaging target space as illustrated in FIG. 1 or may be installed in the robot 10 or other working machinery. A plurality of imaging apparatuses 31 may be provided.

The force sensor 33 is attached to the base portion of the end effector 11 of the robot 10. The force sensor 33 is composed of a distortion gauge and a piezoelectric element to measure the force (reaction force) applied to the robot 10 in contact with the target object or the surrounding objects 42 and output force information as the measurement result to the information processing apparatus 20. The force sensor 33 may be a six-axis force sensor (Force/Torque sensor) or a three-axis force sensor. The force sensor 33 may be a one-dimensional pressure sensor or a contact sensor that determines the presence or absence of contact.

The position detection sensor 34 detects the position of the robot 10 and outputs position detection information as the detection result to the information processing apparatus 20. The position detection sensor 34 is composed of an encoder attached to the robot 10, and can detect the position of the robot 10 using forward kinetics based on angle information acquired from the encoder. The position detection sensor 34 can be used along with the force sensor 33 to detect the position of the robot 10 in contact with the target object 41 or the surrounding objects 42. The method for detecting the position of the robot 10 is not limited to the foregoing one using the position detection sensor 34.

Figure 2:
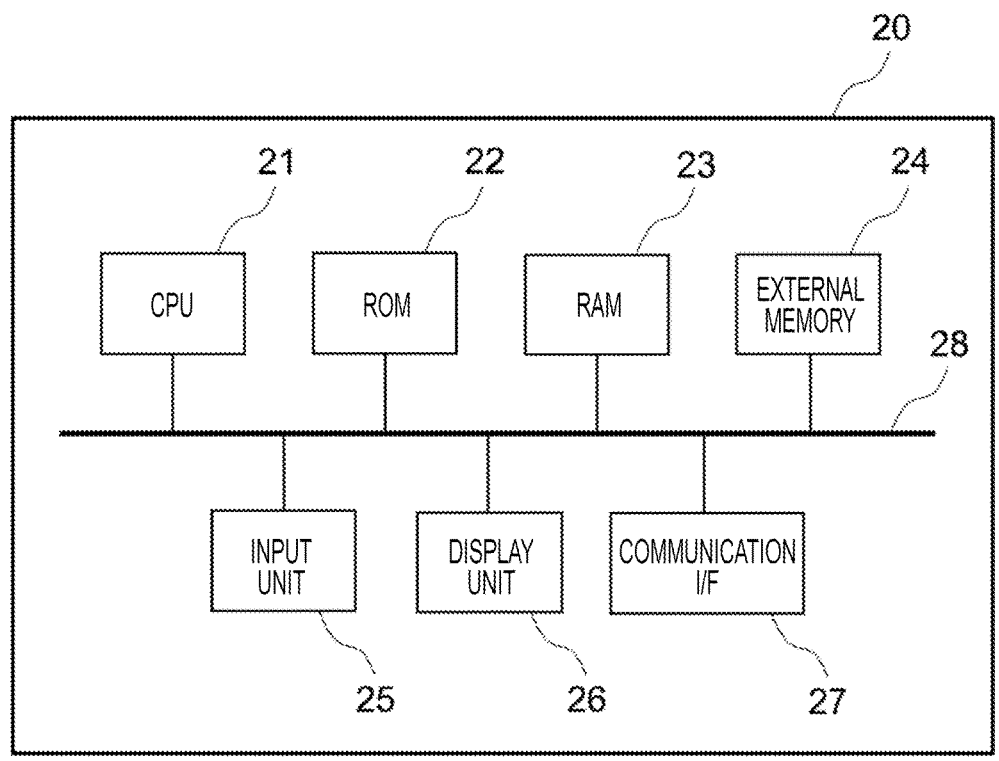
FIG. 2 is a diagram illustrating a hardware configuration example of an information processing apparatus.

The information processing apparatus 20 is composed of a robot control apparatus that controls operations of the robot 10. The information processing apparatus 20 is composed of a personal computer (PC), for example. FIG. 2 illustrates an example of a hardware configuration of the information processing apparatus 20. The information processing apparatus 20 includes a CPU 21, ROM 22, RAM 23, an external memory 24, an input unit 25, a display unit 26, a communication I/F 27, and a system bus 28.

The CPU 21 performs a centralized control of operations of the information processing apparatus 20, and controls the components (22 to 27) via the system bus 28. The ROM 22 is non-volatile memory that stores programs necessary for the CPU 21 to execute processing. The programs may be stored in the external memory 24 or a detachable storage medium (not illustrated). The RAM 23 serves as a main memory and a work area for the CPU 21. That is, for execution of processing, the CPU 21 loads necessary programs from the ROM 22 into the RAM 23 and executes the programs to implement various functional operations.

The external memory 24 stores various data and various kinds of information necessary for the CPU 21 to perform processing using the programs, for example. The external memory 24 also stores various data and various kinds of information obtained by the CPU 21 performing the processes using the programs, for example. The input unit 25 is composed of pointing devices such as a keyboard and a mouse, for example, and allows the operator to provide instructions to the information processing apparatus 20 via the input unit 25. The display unit 26 is composed of a monitor such as a liquid crystal display (LCD). The communication I/F 27 is an interface for communication with external devices. The system bus 28 connects together communicably the CPU 21, the ROM 22, the RAM 23, the external memory 24, the input unit 25, the display unit 26, and the communication I/F 27.

As described above, the information processing apparatus 20 is communicably connected to the robot 10, the imaging apparatus 31, the light source 32, and the force sensor 33 as external devices via the communication I/F 27 to control operations of these external devices.

Figure 3:
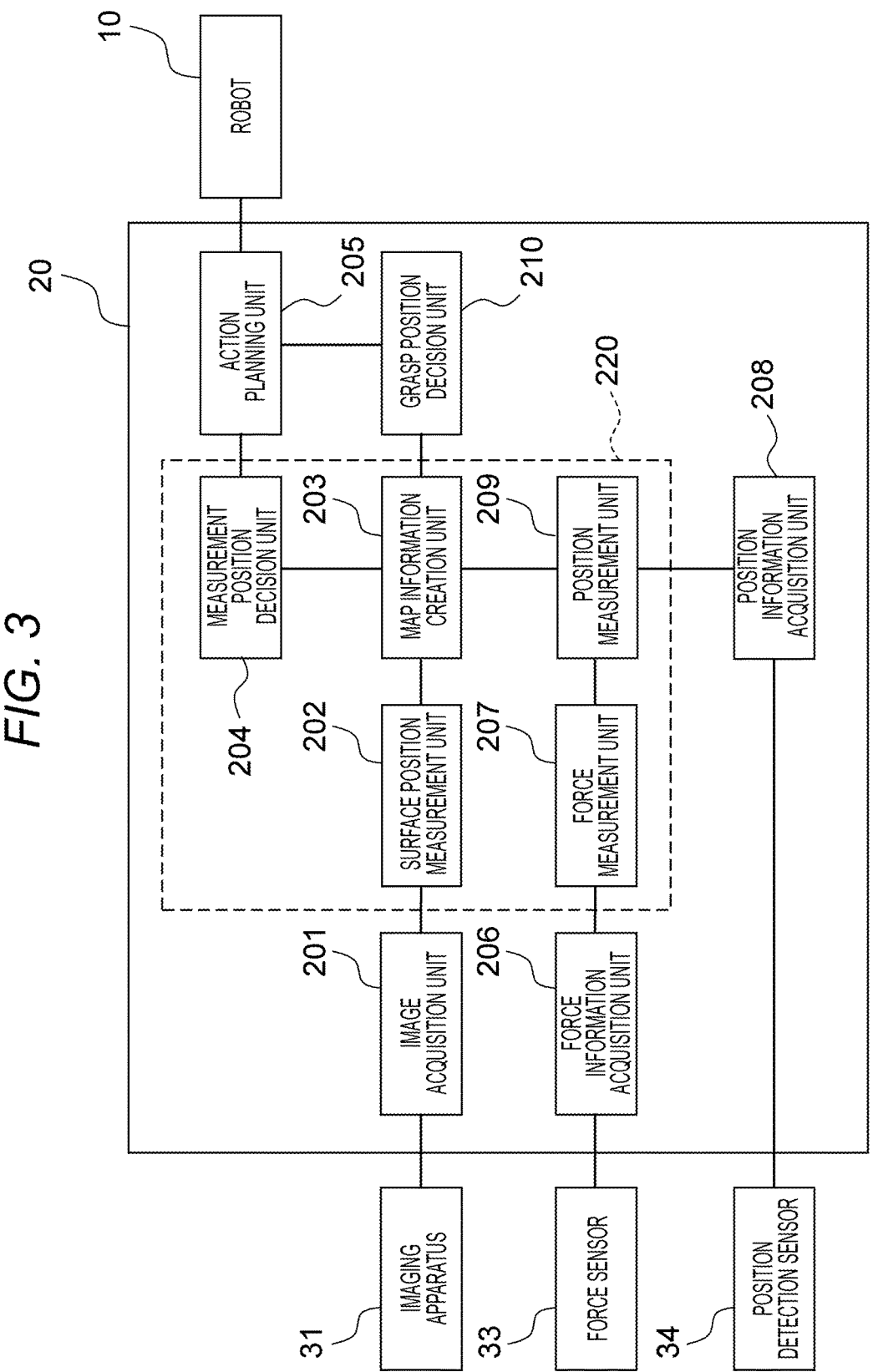
FIG. 3 is a diagram of functional blocks of the information processing apparatus of the first embodiment.

FIG. 3 is a functional block diagram of the information processing apparatus 20.

The information processing apparatus 20 includes an image acquisition unit 201, a surface position measurement unit 202, a map information creation unit 203, a measurement position decision unit 204, and an action planning unit 205. The information processing apparatus 20 further includes a force information acquisition unit 206, a force measurement unit 207, a position information acquisition unit 208, a position measurement unit 209, and a grasp position decision unit 210. The surface position measurement unit 202, the map information creation unit 203, the measurement position decision unit 204, the force measurement unit 207, and the position measurement unit 209 constitute a recognition unit 220 that recognizes the position and orientation of the target object 41. The recognition unit 220 can operate as an object recognition device.

The image acquisition unit 201 acquires image information output from the imaging apparatus 31. The image acquisition unit 201 converts the acquired image information to image data and outputs the same to the surface position measurement unit 202. The image acquisition unit 201 is composed of a capture board and a memory (RAM), for example. The surface position measurement unit 202 measures information on the surface positions of the target object 41 and the surrounding objects 42 (surface position information) based on the image data acquired from the image acquisition unit 201. The surface position measurement unit 202 outputs the measured surface position information to the map information creation unit 203.

The map information creation unit 203 creates map information based on the surface position information measured by the surface position measurement unit 202, force information measured by the force measurement unit 207 described later, and position information measured by the position measurement unit 209 described later. The map information creation unit 203 acquires the force information measured by the force measurement unit 207 via the position measurement unit 209. The map information is spatial position information on the target object 41 and the surrounding objects 42, and constitutes position information on the target object 41 and the surrounding objects 42 in a three-dimensional space in the embodiment. The map information creation unit 203 first creates the map information based on the surface position information, and then updates the map information created based on the surface position information, based on the force information and the position information to create detailed map information.

The surface positions of the target object 41 and the surrounding objects 42 can be determined from the surface position information measured based on the image data. As described above, however, when the target object 41 is a toner cartridge wrapped in a plastic bag, the surface position determined from the surface position information is the surface position of the plastic bag, not the surface position of the toner cartridge. Accordingly, the accurate position and orientation of the target object may not be determined from the surface position information measured based on the image data.

In the embodiment, to recognize the target object 41 more accurately, the robot 10 contacts directly the target object 41 to measure the target object 41. Specifically, the position information on the robot 10 in contact with the target object 41 (contact position information) is measured with the use of the force sensor and the position detection sensor 34. Then, the map information is updated using the measured position information on the robot 10. That is, the map information creation unit 203 creates the map information by adding the detailed position of the target object 41 measured by the force sensor 33 and the position detection sensor 34 in contact with the target object 41 to the surface position of the target object 41 measured using the imaging apparatus 31. In this manner, the position and orientation of the target object 41 are measured in more detail. The map information creation unit 203 outputs the created map information to the measurement position decision unit 204 and the grasp position decision unit 210.

The measurement position decision unit 204 decides the measurement position for more detailed measurement of the position and orientation of the target object 41, based on the map information input from the map information creation unit 203. The map information input into the measurement position decision unit 204 is the map information created by the map information creation unit 203 based on the surface position information. The measurement position decision unit 204 refers to the input map information and decides the position with a high probability of the presence of the target object 41 as the measurement position. The measurement position decision unit 204 outputs the decided measurement position to the action planning unit 205.

The action planning unit 205 plans the action of the robot 10 based on the measurement position input from the measurement position decision unit 204. Specifically, the action planning unit 205 creates a trajectory of the robot 10 for moving the end effector 11 to the measurement position and a trajectory of the robot 10 for implementing contact with the target object 41 at the measurement position, and outputs operation instruction information to the robot 10. The action planning unit 205 also can accept input of a grasp position of the target object 41 from a grasp position decision unit 210 described later. Upon receipt of the input grasp position, the action planning unit 205 plans the action of the robot 10 based on the input grasp position. Specifically, the action planning unit 205 creates a trajectory of the robot 10 for moving the end effector 11 to the grasp position and a trajectory of the robot 10 for implementing the grasp of the target object 41 at the grasp position, and outputs operation instruction information to the robot 10.

The force information acquisition unit 206 acquires the force information output from the force sensor 33 and outputs the acquired force information to the force measurement unit 207. The force information acquisition unit 206 is composed of a memory (RAM), for example. The force measurement unit 207 measures force (reactive force) applied to the robot 10 when the end effector 11 of the robot 10 is in contact with the target object 41 or the surrounding objects 42, based on the force information input from the force information acquisition unit 206. The force measurement unit 207 outputs the measured force information to the position measurement unit 209.

The position information acquisition unit 208 acquires the position detection information output from the position detection sensor 34, and outputs the acquired position detection information to the position measurement unit 209. The position information acquisition unit 208 is composed of a memory (RAM), for example. The position measurement unit 209 measures the position of a contact point at which the end effector 11 of the robot 10 is in contact with the target object 41 or the surrounding objects 42, based on the fore information input from the force measurement unit 207 and the position detection information input from the position information acquisition unit 208. The position measurement unit 209 outputs the measured position information (contact position information) to the map information creation unit 203.

The grasp position decision unit 210 decides the grasp position of the target object 41 based on the map information output from the map information creation unit 203. The map information input into the grasp position decision unit 210 constitutes detailed map information created by the map information creation unit 203 based on the force information and the position information. The grasp position decision unit 210 refers to the input map information to decide the position at which the robot 10 can grasp the target object 41 as the grasp position. The grasp position decision unit 210 outputs the decided grasp position to the action planning unit 205.

The functions of the components of the information processing apparatus 20 illustrated in FIG. 3 can be implemented by the CPU 21 illustrated in FIG. 2 executing the program stored in the ROM 22 or the external memory 24.

Operations of the robot system 100 will be explained below.

FIG. 4 is a flowchart of a robot control process executed by the information processing apparatus 20. The process described in FIG. 4 is implemented by the CPU 21 of the information processing apparatus 20 reading the program from the ROM 22 or the external memory 24 and executing the same. However, part or all of the process described in FIG. 4 may be implemented by dedicated hardware. The process described in FIG. 4 is started when the operator activates the robot system 100, for example. However, the timing for starting is not limited to the activation of the robot system 100.

First, at S1, the CPU 21 performs an initialization process of the system. Specifically, the CPU 21 loads the program from the ROM 22 or the external memory 24, and develops the same on the RAM 23 to turn the same into an executable state. The CPU 21 also reads parameters for the devices connected to the information processing apparatus 20 and returns the devices to their initial positions such that the devices can be used.

Next, at S2, the image acquisition unit 201 acquires image information on the target object 41 and the surrounding objects 42 output from the imaging apparatus 31, and moves to S3. At S3, the surface position measurement unit 202 measures the surface positions of the target object 41 and the surrounding objects 42 based on the image information acquired by the image acquisition unit 201 at S2. The image information obtained from the imaging apparatus 31 is information on three-dimensional point groups. Therefore, the surface position measurement unit 202 can recognize asperities on the surfaces of the target object 41 and the surrounding objects 42 based on the acquired image information. Alternatively, the surface position measurement unit 202 may refer to a component database (component DB) stored in advance in the external memory 24 or the like to decide the surface positions of the target object 41 and the surrounding objects 42. The component DB holds information on the component type and shape of the target object 41 to be recognized. The information on the shape of the target object 41 stored in the component DB is three-dimensional model data such as CAD data or CG data (polygon data), for example. Alternatively, the information on the shape of the target object stored in the component DB may be composed of an assembly of two-dimensional images of the target object 41 and the surrounding objects 42 observed multi-directionally.

At S4, the map information creation unit 203 creates the map information based on the surface position information measured by the surface position measurement unit 202 at S3. A method for creating the map information will be explained specifically below. To create the map information, it is necessary to compile the information obtained from a plurality of different sensors into one unit of spatial map information. However, the imaging apparatus coordinate system of the imaging apparatus 31, the force sensor coordinate system of the force sensor 33, and the robot coordinate system of the robot 10 are all different. Therefore, these coordinate systems need to be integrated.

First, as a reference coordinate system in the working space, a world coordinate system $\Sigma w$ is set. Then, the displacements from the world coordinate system $\Sigma w$ to a robot coordinate system $\Sigma r$ are designated as (RX, RY, and RZ). A rotation matrix of 3×3 indicating the orientation of the robot 10 is designated as RM.

The displacements from the robot coordinate system $\Sigma r$ to a leading end coordinate system $\Sigma f$ of the robot 10 are designated as (FX, FY, and FZ). A rotation matrix of 3×3 indicating the orientation of the leading end of the robot 10 is designated as FM. The displacements from the leading end coordinate system $\Sigma f$ to a leading end coordinate system $\Sigma e$ of the end effector 11 of the robot 10 are designated as (EX, EY, and EZ). A rotation matrix of 3×3 indicating the orientation of the leading end of the end effector 11 is designated as EM. The leading end of the end effector 11 is a portion to be in contact with the target object 41 or the surrounding objects 42.

The displacements from the leading end coordinate system $\Sigma f$ of the robot 10 to a force sensor coordinate system $\Sigma t$ are designated as (TX, TY, and TZ). A rotation matrix of 3×3 indicating the orientation of the force sensor 33 is designated as TM. The displacements from the robot coordinate system $\Sigma r$ to an imaging apparatus coordinate system $\Sigma c$ are designated as (CX, CY, and CZ). A rotation matrix of 3×3 indicating the orientation of the imaging apparatus 31 is designated as CM. The displacements from the imaging apparatus coordinate system $\Sigma c$ to a target object coordinate system $\Sigma v$ are designated as (VX, VY, and VZ). A rotation matrix of 3×3 indicating the orientation of the target object 41 is designated as VM. The displacements of the target object 41 as seen from the world coordinate system $\Sigma w$ are designated as (WX, WY, and WZ), and a rotation matrix of 3×3 indicating the orientation of the target object 41 is designated as WM.

When the robot 10 is in contact with the target object 41, the position of the leading end of the end effector 11 attached to the leading end of the robot 10 coincides with the position of the target object 41 imaged by the imaging apparatus 31. Therefore, the following equations (1) and (2) hold.

[Equation 1]

$$\begin{pmatrix} & & & WX \\ & WM & & WY \\ & & & WZ \\ 0 & 0 & 0 & 1 \end{pmatrix} = \begin{pmatrix} & & & RX \\ & RM & & RY \\ & & & RZ \\ 0 & 0 & 0 & 1 \end{pmatrix} \cdot \begin{pmatrix} & & & FX \\ & FM & & FY \\ & & & FZ \\ 0 & 0 & 0 & 1 \end{pmatrix} \cdot \begin{pmatrix} & & & EX \\ & EM & & EY \\ & & & EZ \\ 0 & 0 & 0 & 1 \end{pmatrix} \quad (1)$$

$$\begin{pmatrix} & & & WX \\ & WM & & WY \\ & & & WZ \\ 0 & 0 & 0 & 1 \end{pmatrix} = \begin{pmatrix} & & & RX \\ & RM & & RY \\ & & & RZ \\ 0 & 0 & 0 & 1 \end{pmatrix} \cdot \begin{pmatrix} & & & CX \\ & CM & & CY \\ & & & CZ \\ 0 & 0 & 0 & 1 \end{pmatrix} \cdot \begin{pmatrix} & & & VX \\ & VM & & VY \\ & & & VZ \\ 0 & 0 & 0 & 1 \end{pmatrix} \quad (2)$$

When the force applied to the robot 10 during the contact operation is represented as a matrix WT of 4×4 as seen from the world coordinate system $\Sigma w$, the matrix WT is determined by the following equation. Using the equation (3), the direction of the force can be considered in the world coordinate system $\Sigma w$.

[Equation 2]

$$WT = \begin{pmatrix} & & & RX \\ & RM & & RY \\ & & & RZ \\ 0 & 0 & 0 & 1 \end{pmatrix} \cdot \begin{pmatrix} & & & FX \\ & FM & & FY \\ & & & FZ \\ 0 & 0 & 0 & 1 \end{pmatrix} \cdot \begin{pmatrix} & & & TX \\ & TM & & TY \\ & & & TZ \\ 0 & 0 & 0 & 1 \end{pmatrix} \quad (3)$$

The map information creation unit 203 creates the map information under the foregoing definitions. Specifically, the map information creation unit 203 uses the foregoing equations (1) to (3) to integrate coordinate systems of the plurality of different sensors, and after the integration of the coordinate systems, the map information creation unit 203 creates the map information using the information obtained from the respective sensors.

At S4, the map information creation unit 203 first arranges voxels in the working space of the world coordinate system $\Sigma w$. In this example, the area in the presence of the voxels is an area with a possibility of the presence of the target object 41 or the surrounding objects 42. The size of the voxels is set as appropriate depending on the accuracy required for the grasp operation of the target object 41.

Next, the map information creation unit 203 uses the surface position information to perform a process for deleting all the voxels existing outside the surface positions of the target object 41 and the surrounding objects 42. The surface position information constitutes three-dimensional point group data. The surface position information is determined as information on the imaging apparatus coordinate system $\Sigma c$. Accordingly, the surface position of the target object 41 can be converted into the world coordinate system $\Sigma w$ using the equation (2). When point groups exist in the voxels arranged within the world coordinate system $\Sigma w$, the voxels are to be deleted. The area from which the voxels are deleted is processed as a part in the absence of the object. Accordingly, the map information creation unit 203 creates the map information indicative of the space in the approximate presence of the target object 41 and the surrounding objects 42.

At S5, the measurement position decision unit 204 decides the measurement position of the target object 41 based on the map information created at S4. Specifically, the measurement position decision unit 204 refers to the map information to select a part with a convex surface based on the information on the asperities on the surfaces of the target object 41 and the surrounding objects 42. Then, the measurement position decision unit 204 decides the selected part with a high capability of presence of the target object 41 as the measurement position for detailed measurement of the target object 41. When the position of the target object 41 can be estimated using the component DB, the measurement position may be decided based on the estimated position. In this manner, when the rough position and orientation of the target object 41 can be estimated from the component DB, the measurement position decision unit 204 decides the measurement position at which it is checked by direct contact if the estimated position and orientation are correct.

Figure 5A:
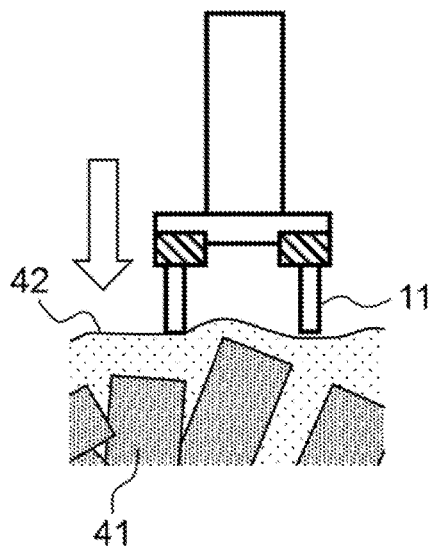
FIGS. 5A and 5B are diagrams describing the operations in the first embodiment.
Figure 5B:
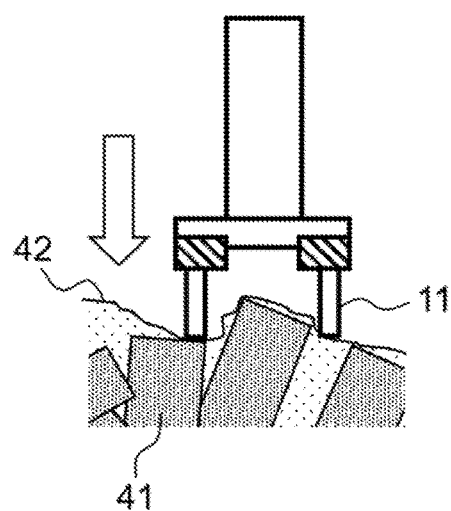

At S6, the action planning unit 205 decides an action plan for the robot 10 to implement the measurement at the measurement position, based on the measurement position decided by the measurement position decision unit 204 at S5. Next, at S7, the action planning unit 205 outputs operation instruction information to the robot 10 based on the action plan decided at S6. Accordingly, the robot 10 moves the end effector 11 to the measurement position to perform the contact operation on the target object 41 at the measurement position. The operations of the robot 10 at that time include not only moving the end effector 11 simply to the surface position measured by the surface position measurement unit 202 but also moving the end effector 11 more deeply than the surface position to acquire the force information. As illustrated in FIG. 5A, when the target object 41 is wrapped in the surrounding object 42 such as a plastic bag or a cushioning material, the end effector 11 moves while crushing the surrounding object 42 as illustrated in FIG. 5B.

At S8, the force information acquisition unit 206 acquires the force information output from the force sensor 33. The position information acquisition unit 208 acquires the position detection information output from the position detection sensor 34 in synchronization with the acquisition of the force information by the force information acquisition unit 206. At S9, the force measurement unit 207 measures the force information indicative of the force applied to the robot 10 based on the force information acquired by the force information acquisition unit 206 at S8. The position measurement unit 209 measures the position information indicative of the position of the robot 10 based on the position detection information acquired by the position information acquisition unit 208 at S8.

The force information and the position information may be measured repeatedly while the robot 10 performs the contact operation on the target object 41. In this case, the flowchart of FIG. 4 shows S7 to S9 as a one-directional flow, but actually, the process at S7 to S9 are repeated at a high speed, from S7 to S8, from S8 to S9, and from S9 to S7. That is, while moving, the robot 10 acquires the force information and the position information, and performs the force measurement and the position measurement. The robot 10 may perform not only S7 to S9 but also update the map information at S10. In this case, the process does not return from S9 to S7 but flows repeatedly at a high speed from S7 to S8, from S8 to S9, from S9 to S10, and S10 to S7. The robot 10 performs the contact operation such that the magnitude of the force applied to the robot 10 does not exceed a preset upper limit value. Whether the magnitude of the force applied to the robot 10 exceeds the upper limit value is determined based on the force information measured at S9. During the contact operation, the force applied to the robot 10 increases depending on the force of contact with the target object 41. Accordingly, the upper limit value for the force is set to a degree that the contact operation causes no failure such as breakage of the target object 41. For example, when the target object 41 is a toner cartridge wrapped in a plastic bag, the upper limit value is set to a degree that the plastic bag is crushed but the toner cartridge is not broken.

When the robot 10 crushes the plastic bag and abuts against the surface of the toner cartridge and then the force applied to the robot 10 reaches the upper limit value, the information processing apparatus 20 stops the contact operation of the robot 10. The position of the robot 10 at the point in time when the contact operation is stopped can be recognized as actual surface position of the target object 41.

At S10, the map information creation unit 203 updates the map information created at S4 based on the force information and the position information measured at S9 to create new map information. At S10, the map information creation unit 203 uses the position information acquired at S9 as the result of the actual operation of the robot 10 at the measurement position. Then, the map information creation unit 203 performs a process for deleting the voxels equivalent to the space in which the robot 10 moved from the map information created at S4.

At that time, the map information creation unit 203 uses pre-held three-dimensional model information on the robot 10 to calculate the position occupied by the robot 10 (occupied position) at each time from joint angle data based on the forward kinetics. As for the end effector 11 part, similarly, the map information creation unit 203 uses pre-held three-dimensional model information on the end effector 11 to calculate the occupied position from the position and orientation of the leading end of the robot 10. In this manner, the occupied position can be calculated based on data on the joint angles of the robot as position detection information obtained from the position detection sensor 34 installed in the robot 10. At that time, as in the process for integrating the coordinate systems described above, translation vectors of displacements are determined from inter-link lengths, rotation matrixes of 3×3 from the joint angles are determined, and the forward kinetics are used. Accordingly, the three-dimensional position and orientation of the robot 10, that is, the displacements (FX, FY, and FZ) from the robot coordinate system Σr to the leading end coordinate system Σf of the robot 10 and the rotation matrix FM can be determined.

The occupied positions determined as described above are calculated as position information in the world coordinate system Σw by integration of the coordinate systems. Accordingly, the voxels corresponding to the calculated occupied positions can be deleted. Even though the robot 10 is in contact with the target object 41 or the surrounding object 42, when the force measured by the force measurement unit 207 is smaller than the upper limit value, the robot 10 continues to operate. Therefore, in this case, the map information creation unit 203 determines that the robot 10 does not yet contact fully the target object 41, and performs spatial sweeping concurrently with the continued operation of the robot 10, and deletes the voxels. When the target object 41 is wrapped in a plastic bag or the like, the end effector 11 crushes the plastic bag and the robot 10 continues operation in the space where only the plastic bag exists. Accordingly, the areas in the voxels corresponding to the space where only the plastic bag exists are deleted.

When the robot 10 contacts the target object 41 and the force applied to the robot 10 reaches the upper limit value, the robot 10 stops operation at that point in time. The map information creation unit 203 stops the process for deleting the voxels and determines that there is no object in the space swept until the contact position is reached and any object exists at the contact position, and terminates the creation of the map information.

The map information may be created by a method without arrangement of the voxels. For example, the surface position information as three-dimensional point group data may be converted into plane form data, and the surface positions of the target object 41 and the surrounding objects 42 may be represented by the use of polygons. In this case, with the surface position information created from polygons as initial values, surface generation may be performed based on the three-dimensional position information in the space swept by the robot 10 to create the map information. In the case of creating the map information two-dimensionally, the map information may be created by the same method as described above on a two-dimensional plane with the use of pixels instead of voxels.

At S11, the grasp position decision unit 210 determines whether the target object 41 can be grasped by the end effector 11 of the robot 10 based on the result of creation of the map information at S10. When the target object 41 can be grasped, the grasp position decision unit 210 determines that the measurement is to be terminated, and when the target object 41 cannot be grasped, the grasp position decision unit 210 determines that the measurement is to be continued.

Specifically, the grasp position decision unit 210 estimates the position and orientation of the target object 41 to be grasped based on the map information, and the grasp position decision unit 210 determines whether the target object 41 can be grasped based on the estimated position and orientation of the target object 41 and the shape of the end effector 11 of the robot 10. When the end effector 11 grasps the side surfaces of the target object 41 from above, the end effector 11 comes close to the side surface of the target object 41. In this case, the grasp position decision unit 210 determines based on the map information whether there is a space above the target object 41 where the robot 10 can move. The presence or absence of the space is determined whether the voxels are deleted from the map information.

When there is such a space, the grasp position decision unit 210 determines that the robot 10 can move to the upper side of the target object 41. Then, the grasp position decision unit 210 determines whether there is a space where the end effector 11 comes close to the side surfaces of the target object 41 by the operation with the contact. When there is a space where the end effector 11 can come close to the side surfaces of the target object 41, the end effector 11 can grasp the target object 41. The grasp position decision unit 210 thus determines that the measurement is to be terminated, and the process moves to S12. Meanwhile, when the grasp position decision unit 210 does not determine that the end effector 11 can grasp the target object 41, the process returns to S5 to continue the measurement. In this manner, the grasp position decision unit 210 decides the position of the space into which the end effector 11 as a grasp portion of the robot 10 can be inserted, as the position where the robot 10 can grasp the target object 41.

When not determining that the target object 41 can be grasped at S11, the grasp position decision unit 210 performs again the process for deciding the measurement position at S5. At that time, the grasp position decision unit 210 may use the results of the foregoing processes. For example, the robot is operated to determine whether the target object 41 can be grasped at S11. At the time of deciding the measurement positions, the next measurement position may be determined from another measurement position. Specifically, it is assumed that there is a plurality of candidates for the measurement position. In this case, as described above in relation to S5, the grasp position decision unit 210 decides the portion with a high capability of presence of the target object 41 as the measurement position from the state of asperities on the surface. When using the capabilities of presence as evaluation functions, the grasp position decision unit 210 decides the position with the largest value of the evaluation function as measurement position for this measurement, and then the grasp position decision unit 210 decides the position with the second largest value of the evaluation function as the measurement position for the next measurement. These results may be included in the created map information. In this manner, the same process may not be simply repeated but the map information may be updated sequentially by the results of the processes such that the updated information may be used in the next process. This saves the robot 10 from moving many times to the positions where the target object 41 cannot be grasped. In addition, the robot 10 can move to the positions in descending order of possibility that the target object 41 can be grasped. Accordingly, it is more likely that, even when the robot 10 fails to grasp the target object 41 in the first process, the robot 10 may be able to grasp the target object 41 in the second and subsequent processes.

FIG. 4 shows the determination on whether the target object can be grasped at S11. This includes not only the determination on whether the target object can be simply grasped but also the robot 10 can move to the position where the robot 10 can perform the grasp operation. In some cases, the robot 10 cannot move to the position where the robot 10 is planned to perform the grasp operation due to unexpected failure. In that case, the grasp position decision unit 210 does not determine that the robot 10 can grasp the target object 41, and the process moves to S5.

At S12, the grasp position decision unit 210 decides the grasp position of the target object 41 based on the map information created at S10. The grasp position decision unit 210 decides the grasp position of the target object 41 from the positions where it is determined that the target object 41 can be grasped at S11.

At S13, the action planning unit 205 decides an action plan for the robot 10 to implement the grasp operation of the target object 41 at the grasp position decided at S12. To decide the action plan, the action planning unit 205 refers to an operation database (operation DB) stored in advance in the external memory 24 or the like based on the grasp position. The operation DB holds information on the component types and the work procedures. The action plan for the robot can be decided with the use of a general path search algorithm. As the path search algorithm, a sampling search technique such as RRT (Rapidly-exploring Random Tree) or PRM (Probabilistic RoadMap) can be used, for example. At the time of deciding the action plan, the map information is used to input three-dimensional position information on where the target object 41 and obstacles exist. By using the technique as described above, the action planning unit 205 decides the action plan for the robot 10 to grasp the target object 41 while avoiding the obstacles. However, any other technique may be used as far as the same result can be obtained.

At S14, the action planning unit 205 outputs operation instruction information to the robot 10 based on the action plan decided at S13. Accordingly, the robot 10 moves the end effector 11 to the grasp position to perform the grasp operation on the target object 41 at the grasp position. The target object 41 grasped by the robot 10 is transferred to a predetermined place according to the work procedure accumulated in the operation DB.

At S15, the CPU 21 determines whether there is the next target object 41 to be recognized based on the image information acquired by the image acquisition unit 201. Then, when there is no target object 41, the CPU 21 determines that the recognition process is to be terminated and terminates the process described in FIG. 4. When there exists the target object 41, the CPU 21 determines that the recognition process is to be continued and returns to S2.

In this manner, the information processing apparatus 20 decides the measurement position for measuring the position and orientation of the target object 41 in more detail based on the surface position information measured depending on the image information obtained from the imaging apparatus 31, and then moves the robot 10 to the decided measurement position. Then, the information processing apparatus 20 causes the robot 10 to contact actually the target object 41 at the measurement position and measure the detailed position of the target object 41 during the contact operation based on the force information and the position detection information measured by the force sensor 33 and the position detection sensor 34. The position and orientation of the target object 41 are recognized by creating the map information. Accordingly, it is possible to recognize even the target object 41 wrapped in a plastic bag or a cushioning material that could not be accurately recognized only the imaging apparatus 31, in a proper manner for the grasp operation. Therefore, the target object 41 can be grasped in an increasing number of cases to improve work efficiency.

In the embodiment, the contact operation on the target object 41 is performed once. However, when the target object 41 cannot be recognized at one time, the contact operation may be repeated plural times to create the map information. This improves the accuracy of the recognition.

In the embodiment, as described above, the surface position measurement unit 202 measures (acquires) the surface position information on the objects (the target object 41 and the surrounding objects 42), and the measurement position decision unit 204 decides the measurement position for actually measuring the target object 41. The force measurement unit 207 and the position measurement unit 209 measure the contact position information on contact with the target object 41 at the measurement position. The map information creation unit 203 recognizes the position and orientation of the target object 41 based on the surface position information and the contact position information.

In this manner, the detailed position of the target object 41 can be recognized by actual contact with the target object 41 to measure the contact position information. Accordingly, the position and orientation of the target object 41 as a content wrapped in a plastic bag or a cushioning material can be recognized in a proper manner. That is, the actual position and orientation of the target object 41 can be recognized even when they could not be recognized only from the surface position information. Therefore, the robot 10 can grasp the target object 41 in an increasing number of cases to improve work efficiency.

The map information creation unit 203 creates the map information indicative of the spatial position information on the target object 41 based on the surface position information and the contact position information, and recognizes the position and orientation of the target object 41 based on the created map information. In this manner, the map information creation unit 203 creates the map information taking into account the position information obtained by actual contact with the target object 41, thereby allowing the position and orientation of the target object 41 to be recognized in a proper manner.

At the time of creating the map information, the map information creation unit 203 first creates the map information based on the surface position information, and then updates the map information created based on the surface position information, based on the contact position information measured at the measurement position. In this manner, the map information creation unit 203 creates the map information by combination of the results of the surface position measurement of the target object 41 by the imaging apparatus 31 and the results of the position measurement by the force sensor 33 and the position detection sensor 34. This makes it possible to create the final map information in such a manner that the rough map information created based on the surface position information is properly complemented with supplementary information. Therefore, the robot 10 can operate and recognize properly the shape of the target object 41 even when the position and orientation of the target object 41 cannot be determined only from the information acquired from the imaging apparatus 31.

The measurement position decision unit 204 detects the position with a convex surface based on the surface position information, and decides the detected position as the measurement position. Therefore, it is possible to select and measure the part with a high capability of presence of the target object 41 from the coexistence of the target object 41 and the surrounding objects 42.

The surface position measurement unit 202 acquires the surface position information based on the image information on the captured images of the target object 41 and the surrounding objects 42. Therefore, the surface position information can be easily acquired.

The force measurement unit 207 measures (acquires) reaction force generated at the time of contact with the target object 41, and the position measurement unit 209 measures (acquires) the position of a contact point with the target object 41. The position measurement unit 209 then measures the position of the contact point when the reaction force measured by the force measurement unit 207 reaches a predetermined upper limit value, thereby measuring the contact position information. Therefore, when the target object 41 is wrapped in a soft member such as a plastic bag, it is possible to crush the member wrapping the target object 41 and contact directly the target object 41 to measure the contact position information. At that time, by setting as the upper limit value the force by which the plastic bag or the cushioning material is crushed but the target object 41 as the content is not broken, the position and orientation of the target object 41 can be recognized in an accurate manner.

The grasp position decision unit 210 decides the grasp position at which the robot 10 can grasp the target object 41 based on the position and orientation of the target object 41 recognized from the map information created by the map information creation unit 203. In this manner, the grasp position decision unit 210 decides the grasp position based on the map information created taking into account the position information obtained by actual contact with the target object 41. Therefore, the grasp position can be decided with high accuracy, and therefore the grasp operation of the robot 10 can be successfully performed with high capability. At that time, the grasp position decision unit 210 decides the position of a surrounding space into which the grasp portion of the robot 10 can be inserted, and therefore the grasp position can be decided in a proper manner.

Second Embodiment

Next, a second embodiment of the present invention will be explained.

In the second embodiment, as compared to the first embodiment, a grasp force measurement sensor is additionally provided to measure grasp force during the grasp operation, and grasp force information measured by the grasp force measurement sensor is used to create the map information in more detail. Specifically, first, as in the first embodiment, the imaging apparatus 31 measures the surface position information on the target object 41 and the surrounding objects 42. Then, as in the first embodiment, the measurement position of the target object 41 is decided based on the surface position information, and the contact operation on the target object 41 is performed at the measurement position. Then, during the contact operation, the force sensor 33 and the position detection sensor 34 are used to measure the position information when the robot 10 is in contact with the target object 41, and the grasp position of the target object 41 is decided based on the measured position information. In the embodiment, the grasp force measurement sensor and the position detection sensor 34 are used to measure grasp width information on the target object 41 during the grasp operation at the grasp position. Then, the map information is created by integrating the surface position information, the position information, and the grasp width information, thereby to recognize the shape of the target object 41 for grasping.

In the first embodiment, the target object 41 is recognized from the information obtained before the robot 10 grasps the target object 41. Accordingly, when the target object 41 is mixed in a plurality of kinds of objects different in size, the robot 10 may not grasp the target object 41. Accordingly, in the second embodiment, the component DB is referred to compare the grasp width measured during the grasp operation to the size (width) of the target object 41, thereby determining whether the object grasped by the robot 10 during the grasp operation is the target object 41. In addition, the map information is created also during the grasp operation.

Figure 6:
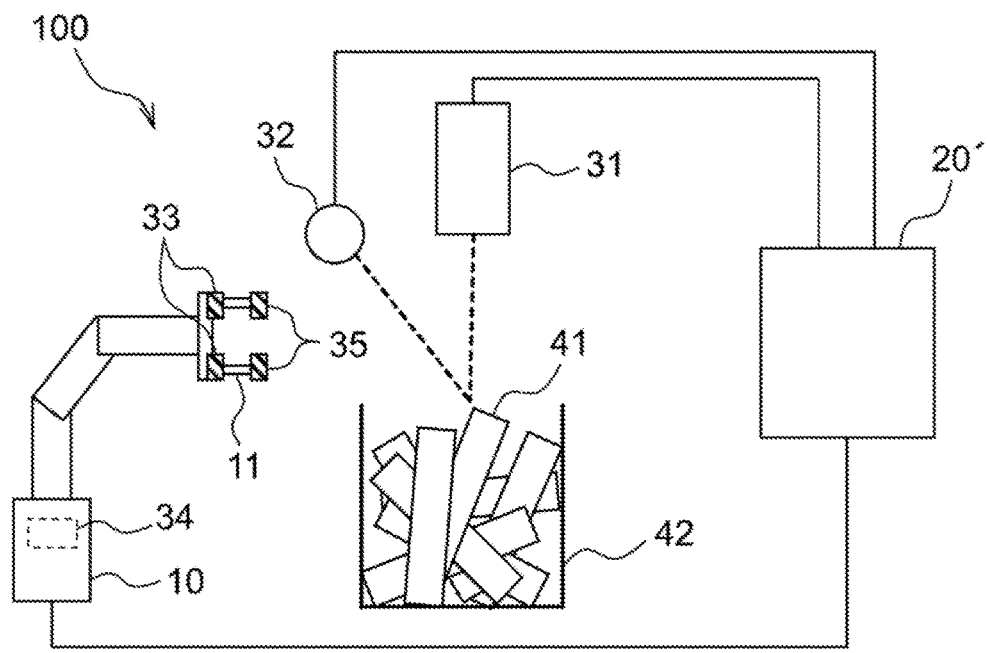
FIG. 6 is a diagram illustrating a configuration example of a robot system of a second embodiment.

FIG. 6 illustrates a configuration example of the robot system 100 in the second embodiment. Referring to FIG. 6, the same components as those of the first embodiment will be given the same reference signs as those shown in FIG. 1 and the different components will be mainly explained below.

The robot system 100 in the embodiment is different from the one illustrated in FIG. 1 in that a grasp force measurement sensor 35 is attached to the leading end of the end effector 11 of the robot 10. The grasp force measurement sensor 35 is composed of a distortion gauge and a piezoelectric element that measure the grasp force by which the robot 10 grasps the target object 41, and output grasp force information as the measurement result to an information processing apparatus 20'. The grasp force measurement sensor 35 may be a six-axis force sensor or a three-axis force sensor. The grasp force measurement sensor 35 may also be a one-dimensional pressure sensor or a contact sensor for determining the presence or absence of contact.

Figure 7:
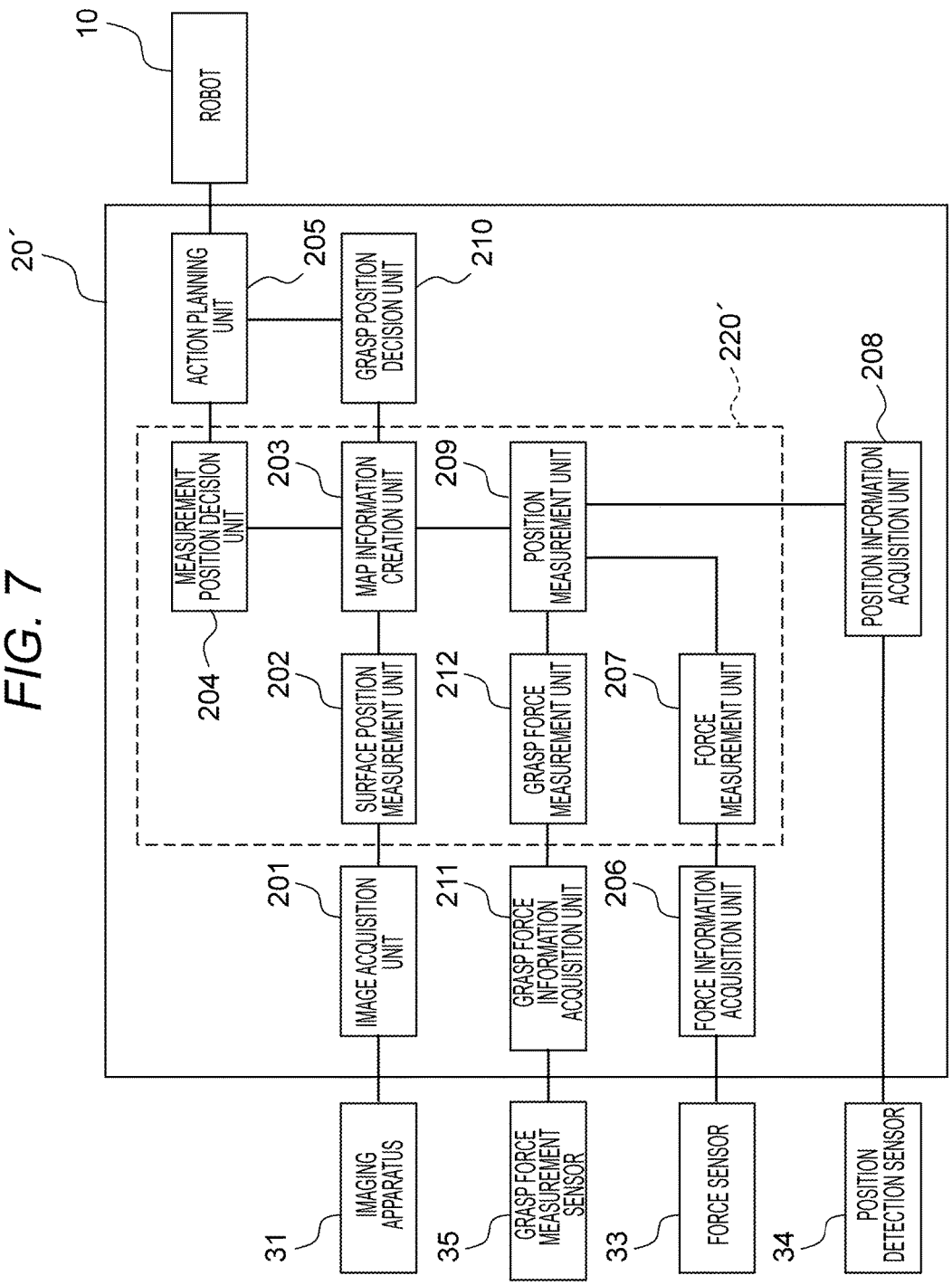
FIG. 7 is a diagram of functional blocks of an information processing apparatus in the second embodiment.

FIG. 7 is a functional block diagram of the information processing apparatus 20' in the embodiment. The information processing apparatus 20' illustrated in FIG. 7 is different from the information processing apparatus 20 illustrated in FIG. 2 in that a grasp force information acquisition unit 211 and a grasp force measurement unit 212 are additionally provided.

The grasp force information acquisition unit 211 acquires the grasp force information output from the grasp force measurement sensor 35, and outputs the acquired grasp force information to the grasp force measurement unit 212. The grasp force information acquisition unit 211 is composed of a memory (RAM), for example. The grasp force measurement unit 212 measures the force applied to the robot 10 grasping an object by the end effector 11 based on the grasp force information input from the grasp force information acquisition unit 211. The grasp force measurement unit 212 outputs the measured grasp force information to the position measurement unit 209. The surface position measurement unit 202, the map information creation unit 203, the measurement position decision unit 204, the force measurement unit 207, the position measurement unit 209, and the grasp force measurement unit 212 constitute a recognition unit 220' that performs a process for recognizing the position and orientation of the target object 41.

Figure 8:
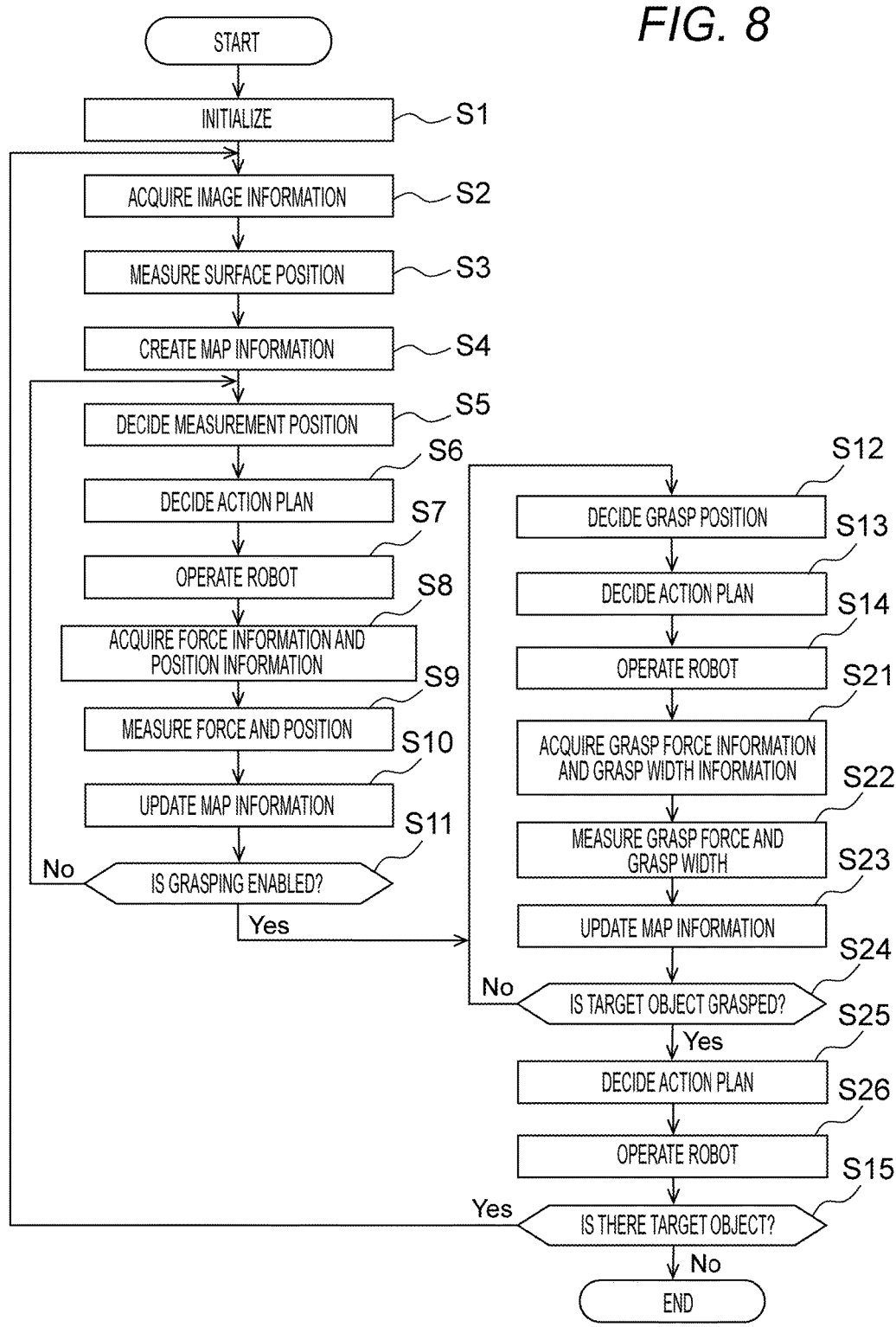
FIG. 8 is a flowchart describing operations in the second embodiment.

FIG. 8 is a flowchart of a procedure for a robot control process executed by the information processing apparatus 20'. The process described in FIG. 8 is the same as the process described in FIG. 4 except that S21 to S26 are added between S14 and S15 described in FIG. 4. Therefore, the different steps will be mainly explained below.

At S21, the grasp force information acquisition unit 211 acquires the grasp force information output from the grasp force measurement sensor 35. The position information acquisition unit 208 acquires the position detection information output from the position detection sensor 34 in synchronization with the acquisition of the grasp force information by the grasp force information acquisition unit 211. At S22, the grasp force measurement unit 212 measures the grasp force information when the robot 10 grasps the target object 41 based on the grasp force information acquired by the grasp force information acquisition unit 211 at S21. The position measurement unit 209 measures the position of the leading end of the end effector 11 when the robot 10 grasps the target object 41 based on the position detection information acquired by the position information acquisition unit 208 at S21. That is, the position measurement unit 209 measures the grasp width information on the target object 41 grasped by the robot 10.

The grasp force information and the grasp width information are repeatedly measured while the robot 10 performs the grasp operation on the target object 41. The robot 10 performs the grasp operation such that the magnitude of the force applied to the robot 10 grasping the target object 41 does not exceed a preset upper limit value. Whether the magnitude of the force applied to the robot 10 exceeds the upper limit value is determined based on the grasp force information measured at S22. During the grasp operation, the force applied to the robot 10 increases depending on the force of grasping the target object 41. Accordingly, the upper limit value for the force is set to a degree that the grasp operation causes no failure such as breakage of the target object 41. For example, when the target object 41 is a toner cartridge wrapped in a plastic bag, the upper limit value is set to a degree that the plastic bag is crushed but the toner cartridge is not broken.

When the robot 10 crushes the plastic bag and abuts against the surface of the toner cartridge and then the force applied to the robot 10 reaches the upper limit value, the information processing apparatus 20' stops the grasp operation of the robot 10. The grasp width of the end effector 11 of the robot 10 at the point in time when the grasp operation is stopped can be recognized as actual size of the target object 41.

At S23, the map information creation unit 203 updates the map information created at S10 based on the grasp force information and the grasp width information measured at S22 to create new map information. At S23, the map information creation unit 203 uses the grasp width measured at S22 as information indicative of the size of the target object 41. In this manner, the map information creation unit 203 creates the map information with addition of the grasp width information obtained by actual grasp of the target object 41 to recognize the target object 41.

The map information creation unit 203 first performs a process for integrating the coordinate systems. The integration of the coordinate systems of the robot 10, the imaging apparatus 31, and the force sensor 33 is as described above in relation to the first embodiment. Therefore, the coordinate system of the grasp force measurement sensor 35 will be described below. In the embodiment, the displacements from the leading end coordinate system Σf of the robot 10 to a grasp force measurement sensor coordinate system Σg are designated as (GX, GY, and GZ). In addition, a rotation matrix of 3×3 indicating the orientation of the grasp force measurement sensor 35 is designated as GM. When the grasp force applied to the robot 10 during the grasp operation is set as a matrix GT of 4×4 as seen from the world coordinate system Σw, the matrix GT is determined by the following equation (4). Using the equation (4), the direction of the grasp force can be considered in the world coordinate system Σw.

[Equation 3]

$$GT = \begin{pmatrix} & & & RX \\ & RM & & RY \\ & & & RZ \\ 0 & 0 & 0 & 1 \end{pmatrix} \cdot \begin{pmatrix} & & & FX \\ & FM & & FY \\ & & & FZ \\ 0 & 0 & 0 & 1 \end{pmatrix} \cdot \begin{pmatrix} & & & GX \\ & GM & & GY \\ & & & GZ \\ 0 & 0 & 0 & 1 \end{pmatrix} \quad (4)$$

To create the map information, the map information creation unit 203 integrates the coordinate systems of the plurality of different sensors using the equation (4) as well as the foregoing equations (1) to (3). When the coordinate systems are integrated, the map information creation unit 203 creates the map information using the information obtained from the sensors. At S23, the map information creation unit 203 performs a process for adding the results obtained by actual grasp of the target object 41 to the map information created at S10.

At S24, the CPU 21 determines whether the object grasped by the robot 10 is the target object 41 based on the map information created at S23 and the shape information on the target object 41 obtained with reference to the component DB. To make the determination, the CPU 21 estimates the possible width of the target object 41 with consideration given to the degree of deformation of the surrounding object 42 wrapping the target object 41. When the grasp width of the target object 41 falls within the estimated range of possible width, the CPU 21 determines that the object grasped by the robot 10 is the target object 41. When determining that the grasped object is the target object 41, the CPU 21 determines that the operation is to be continued and moves the process to S25. When not determining that the grasped object is the target object 41, the CPU 21 returns the process to S12 to decide again the grasp position and repeat the creation of the map information.

At S25, the action planning unit 205 decides an action plan for the robot 10 to implement the operation on the grasped target object 41. To decide the action plan, the action planning unit 205 refers to information on the component type and the work procedure accumulated in the operation DB based on the grasp position.

At S26, the action planning unit 205 outputs operation instruction information to the robot 10 based on the action plan decided at S25. Accordingly, the robot 10 transfers the target object 41 grasped by the end effector 11 to a predetermined place according to the work procedure accumulated in the operation DB.

As described above, in the embodiment, the target object 41 is recognized by the same method as that of the first embodiment, and when the target object 41 is grasped, the grasp force measurement sensor 35 is used to measure the grasp width of the grasped object. Then, it is determined whether the grasped object is the target object 41 based on the measured grasp width to create the map information in more detail. Accordingly, it is possible to recognize a plurality of kinds of target objects 41 different in size with high accuracy. Therefore, the different kinds of target objects 41 can be grasped properly in an increasing number of cases to increase the possibility of continuing the work.

Specifically, the grasp force measurement unit 212 measures the grasp width information when the target object 41 is grasped at the grasp position, and the map information creation unit 203 uses the grasp width information to recognize the position and orientation of the target object 41. Therefore, it is possible to recognize the shape of the target object 41 for grasping in more detail. For example, even when there is a plurality of kinds of target objects 41 different in size, it is possible to recognize the positions and orientations of the target objects 41 with higher accuracy and increase the possibility of continuing the work by the robot 10. In addition, the grasp width with which the target object 41 is actually grasped is measured to allow the size of the target object 41 to be measured with high accuracy. Therefore, it is possible to determine properly whether the grasped object is the target object 41.

Third Embodiment

Next, a third embodiment will be explained.

In the third embodiment, when the end effector 11 is inserted into the area with occlusion, the created map information is used to make the action plan for the robot 10 without interference with the surrounding objects 42, as compared to the first and second embodiment. The robot control process procedure is the same as that described in the flowchart of FIG. 4 except for S13.

Figure 9A:
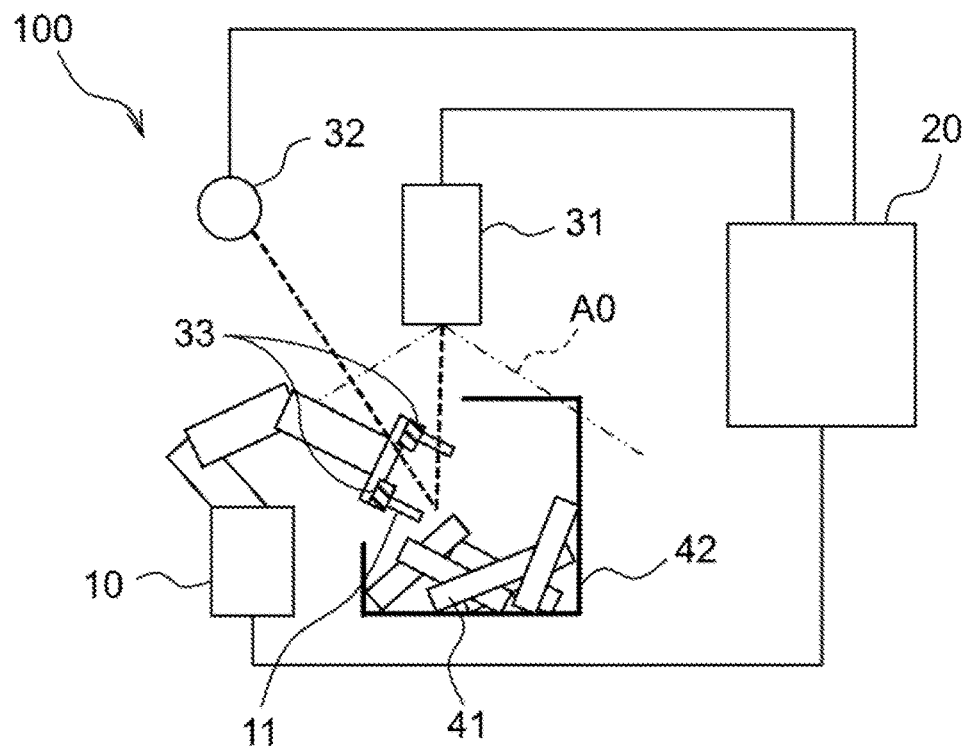
FIGS. 9A and 9B are diagrams illustrating a configuration example of a robot system of a third embodiment.
Figure 9B:
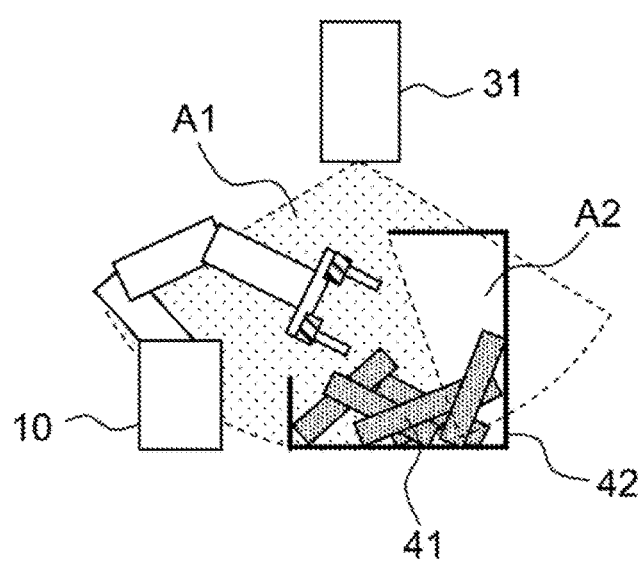

The case in which the end effector 11 is inserted into an area with occlusion means that the area in the presence of the target object 41 is hidden by the surrounding objects 42 or the like relative to an area A0 where the imaging apparatus 31 can perform image capturing as illustrated in FIG. 9A, for example. This case results in an area A1 where the target object 41 is recognizable and an area A2 where the target object 41 is not recognizable when the imaging apparatus 31 attempts to capture an image of the target object 41, as illustrated in FIG. 9B. In this state, even though the target object 41 is grasped, when the target object 41 is transferred and ejected, the target object 41 may interfere with the surrounding objects 42 that cannot be imaged by the imaging apparatus 31. As a result, the grasped target object 41 may drop off.

Accordingly, in the embodiment, the map information created and updated at S4 and S10 is used at S13. The map information created before the grasping of the target object 41 includes not only information on the target object 41 but also information on the surrounding objects 42. Therefore, to make the action plan for the robot 10 to grasp, transfer, and eject the target object 41, the space where the robot 10 can move is limited taking into account spatial information on the presence of the surrounding objects 42.

To acquire the position information on the surrounding objects 42, instead of the force sensor 33, a proximity sensor for detecting a distance to the approached object may be used. In this case, on contact with the target object 41, the proximity sensor acquires directly distance information on the target object 41 at the measurement position to measure the contact position information and create the map information. When the proximity sensor is installed at a position near the force sensor 33 illustrated in FIGS. 1 and 6, the proximity sensor can acquire distance information from the base portion of the end effector 11 to the position of the contact point by the robot 10 with the target object 41. In addition, arranging a plurality of proximity sensors makes it possible to measure the distance information concurrently at a plurality of positions to create the map information. Accordingly, when there is occlusion involved in the measurement by the imaging apparatus 31, it is possible to plan the action for the robot 10 to perform the operation of ejecting the target object 41 in a shorter time after the grasping without interference with the surrounding objects 42 surrounding the target object 41.

Both the force sensor 33 and the proximity sensors may be used for measurement. Using the force sensor 33 and the proximity sensors in combination makes it possible to perform high-accuracy position measurement by the force sensor 33 and perform measurement concurrently at a plurality of positions by the proximity sensors to create the map information. This allows the target object 41 and the surrounding objects 42 to be recognized in a shorter time to plan the action for the robot 10 in a proper manner. The proximity sensors may be infrared sensors, magnetic sensors, or ultrasound sensors.

In this manner, there is a lower possibility that, when the robot 10 transfers the grasped target object 41, the transferred target object 41 interferes with the surrounding objects 42. This reduces a fear that the target object 41 drops off during transfer to improve work efficiency.

Modification Example

In the foregoing embodiments, when the robot 10 fails to grasp, the grasp position decision unit 210 may exclude the grasp position where the robot 10 failed to grasp from the grasp position candidates for the next grasp operation, and decide the grasp position in another place. In this manner, the creation of the map information makes it possible to prevent the same failure in the robot operation. This shortens the time of work by the robot 10.

In the foregoing embodiments, the material for the target object 41 may be recognized from the force information when the robot 10 contacts the target object 41 so that the robot 10 grasps the target object 41 using the recognized information. For example, in the case where the target object 41 is wrapped in a plastic bag as in the foregoing embodiments, when the robot 10 contacts the plastic bag, slight force is applied to the robot 10. In that case, the space in the presence of the plastic bag can be known from the force applied to the robot 10, and therefore the robot 10 may operate (transfer) the target object 41 while grasping the plastic bag. Accordingly, even when the robot 10 cannot grasp the target object 41 itself, the robot 10 can operate the target object 41 to improve the possibility of continuing the work.

In the foregoing embodiments, after the measurement of the detailed position of the target object 41 by the force sensor 33, the imaging apparatus 31 may measure again the surface position of the target object 41. When the force sensor 33 performs measurement plural times, positional shift may be accumulated due to sensor drift. Therefore, the imaging apparatus 31 measures the surface position as appropriate to create the map information with correction made to the positional shift. This makes it possible to create the map information more accurately while suppressing the influence of the positional shift due to the sensor drift, thereby improving the possibility that the work can be done correctly.

In the foregoing embodiments, the imaging apparatus 31 may first perform measurement plural times to acquire the surface position information in more detail. This decreases the number of times the force sensor 33 and the proximity sensors perform measurement later. As a result, it is possible to recognize the target object 41 and plan the action for the robot 10 in a shorter time.

In the foregoing embodiments, the robot grasps and transfers the target object 41 of which the position and orientation are recognized. However, when the purpose is merely to recognize the position and orientation of the target object 41, the robot does not need to grasp or transfer the target object 41. The advantage of the present invention is to allow the position and orientation of the target object 41 to be recognized properly even when the target object 41 cannot be recognized accurately only from the surface position information. Accordingly, the information on the recognized position and orientation of the target object 41 may be presented (displayed) to the worker, or the target object 41 may be inspected based on the information on the recognized position and orientation of the target object 41.

The inspection of the target object 41 here is to check the shape of the target object and check if the target object 41 is in a desired position.

The robot may perform an operation without grasping the target object 41 based on the recognized position and orientation of the target object 41. The operation without grasping the target object 41 means that the robot contacts the target object 41 without grasping and changes the position of the target object 41. When the robot performs an operation on the target object 41, the operation may include or may not include the grasping.

The number of the robot for acquiring the surface position information and the contact position information may be one or more. The robot acquiring the surface position information and the contact position information and the robot performing an operation on the target object such as grasping or transferring may be identical or different.

In the foregoing embodiments, the robot 10 is an assembly robot. However, the robot is not limited to the assembly robot but may be a mobile robot.

In the foregoing embodiments, the map information is three-dimensional information. Alternatively, the map information may be two-dimensional information. In addition, the map information may be created only based on the two kinds of information, that is, the force information measured by the force measurement unit 207 and the position information measured by the position measurement unit 209.

In the foregoing embodiments, the imaging apparatus 31 and the light source 32 may be a laser range finder apparatus. Further, two imaging apparatuses 31 may be used for stereo measurement without the light source 32, or one imaging apparatus 31 may be used without the light source 32. That is, the imaging apparatus may be configured in any manner to measure the surface position information for recognizing the surface positions of the target object 41 and the surrounding objects 42.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-092681, filed May 2, 2016, 2015-149244, filed Jul. 29, 2015, and 2016-019296, filed Feb. 3, 2016, which are hereby incorporated by reference herein in their entirety.

What is claimed is:

1. An information processing apparatus, comprising:
one or more processors; and
a memory coupled to the one or more processors, the memory having stored thereon instructions which, when executed by the one or more processors, cause the information processing apparatus to:
acquire surface position information on an object based on image information of the object captured by a camera;
decide a measurement position for measuring the object based on the acquired surface position information;
control a robot to contact the object at the decided measurement position and measure contact position information when the robot contacts with the object at the decided measurement position;
create map information indicative of spatial position information on the object based on the measured contact position information; and
recognize a position and orientation of the object based on the created map information to control the robot to grasp the object.

2. The information processing apparatus according to claim 1, wherein the information processing apparatus is caused to:
create the map information based on the acquired surface position information acquired based on the image information of the object captured by the camera; and
update the created map information based on the measured contact position.

3. The information processing apparatus according to claim 1, wherein
deciding the measurement position includes detecting a position at a convex surface of the object based on the acquired surface position information based on the image information of the object captured by a camera, and decide the detected position as the measurement position used to control the robot to contact the object.

4. The information processing apparatus according to claim 1, wherein
measuring contact position information includes acquire reaction force when the robot contacts with the object, and
acquiring the position of a contact point with the object, and
measuring the position of the acquired contact point, when the acquired reaction force reaches a predetermined upper limit value, as contact position information.

5. The information processing apparatus according to claim 1, wherein
measuring contact position information includes acquire a distance to the approached object, and measuring contact position information based on the acquired distance when the robot contacts with the object.

6. The information processing apparatus according to claim 1, wherein, when executed by the one or more processors, the instructions further cause the information processing apparatus to decide a grasp position where a robot is allowed to grasp the object based on the recognized position and recognized orientation of the object.

7. The information processing apparatus according to claim 6, wherein
deciding the grasp position includes deciding a position of a space into which a grasp portion of the robot is insertable as the grasp position.

8. The information processing apparatus according to claim 6, wherein, when executed by the one or more processors, the instructions further causes the information processing apparatus to measure grasp width information when the object is grasped at the decided grasp position, and causes the information processing apparatus to use the measured grasp width information to recognize the position and orientation of the object.

9. A robot control apparatus comprising a control unit configured to control operations of the robot performing work on the object in the information processing apparatus according to claim 1.

10. A robot system, comprising at least one sensor and the robot in the robot control apparatus according to claim 9.

11. The robot system according to claim 10, wherein the at least one sensor includes a visual sensor configured to capture an image of the object and acquires image information.

12. The robot system according to claim 10, wherein the at least one sensor includes a force sensor configured to acquire reaction force when the robot contacts with the object.

13. The robot system according to claim 10, wherein the at least one sensor includes a position detection sensor configured to acquire a position and orientation of the robot.

14. The robot system according to claim 10, wherein the at least one sensor includes a force sensor configured to acquire reaction force on grasp of the object.

15. An information processing method, the information processing method using one or more processors and a memory coupled to the one or more processors, the memory having stored thereon instructions which, when executed by the one or more processors, cause the one or more processors to perform the information processing method, the information processing method comprising:
acquiring surface position information on an object based on image information of the object captured by a camera;
deciding a measurement position for measuring the object based on the acquired surface position information;
controlling a robot to contact the object at the decided measurement position; measuring contact position information when the robot contacts with the object at the decided measurement position;
creating map information indicative of spatial position information on the object based on the measured contact position information; and
recognizing a position and orientation of the object based on the created map information to control the robot to grasp the object.

16. A computer-readable storage medium storing a program that when executed by a computer causes the computer to:
acquire surface position information on an object based on image information of the object captured by a camera;
decide a measurement position for measuring the object based on the acquired surface position information;
control a robot to contact the object at the decided measurement position and measure contact position information when the robot contacts with the object at the decided measurement position;
create map information indicative of spatial position information on the object based on the measured contact position information; and
recognize a position and orientation of the object based on the created map information to control the robot to grasp the object.

* * * * *